United States Patent
Sato

(10) Patent No.: US 8,268,742 B2
(45) Date of Patent: Sep. 18, 2012

(54) HIGHLY ZIRCONIA-BASED REFRACTORY AND MELTING FURNACE

(75) Inventor: Hironori Sato, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/267,442

(22) Filed: Oct. 6, 2011

(65) Prior Publication Data

US 2012/0036895 A1  Feb. 16, 2012

Related U.S. Application Data

(63) Continuation of application No. PCT/JP2010/056097, filed on Apr. 2, 2010.

(30) Foreign Application Priority Data

Apr. 6, 2009 (JP) .................................. 2009-091959

(51) Int. Cl.
*C04B 35/484* (2006.01)

(52) U.S. Cl. ........................................ 501/104; 501/105

(58) Field of Classification Search .................. 501/104, 501/105

See application file for complete search history.

(56) References Cited

U.S. PATENT DOCUMENTS

| | | | |
|---|---|---|---|
| 4,705,763 A | 11/1987 | Hayashi et al. | |
| 5,466,643 A | 11/1995 | Ishino et al. | |
| 5,679,612 A | 10/1997 | Endo et al. | |
| 7,598,195 B2 * | 10/2009 | Gupta et al. | .................. 501/105 |
| 7,655,587 B2 | 2/2010 | Boussant-Roux et al. | |

FOREIGN PATENT DOCUMENTS

| | | |
|---|---|---|
| JP | 63-285173 | 11/1988 |
| JP | 02-040018 | 9/1990 |
| JP | 04-193766 | 7/1992 |
| JP | 06-287059 | 10/1994 |
| JP | 08-277162 | 10/1996 |
| JP | 2004-099441 | 4/2004 |
| JP | 2007-517754 | 7/2007 |
| JP | 2008-007358 | 1/2008 |
| WO | WO 2008/113949 | 9/2008 |

OTHER PUBLICATIONS

International Search Report issued May 25, 2010 in PCT/JP2010/056097 filed Apr. 2, 2010.

* cited by examiner

*Primary Examiner* — Karl Group

(74) *Attorney, Agent, or Firm* — Oblon, Spivak, McClelland, Maier & Neustadt, L.L.P.

(57) ABSTRACT

A highly zirconia-based refractory suitable for an electric melting furnace, which has a high electrical resistivity and does not exhibit a chipping off phenomenon and which is scarcely susceptible to extraction of components even when in contact with molten low alkali glass and, hence, is less susceptible to cracking during operation. The highly zirconia-based refractory that includes, as chemical components by mass %, from 85 to 95% of $ZrO_2$ in terms of inner percentage, from 3.0 to 10% of $SiO_2$ in terms of inner percentage, from 0.85 to 3.0% of $Al_2O_3$ in terms of inner percentage, substantially no $Na_2O$, from 0.01 to 0.5% of $K_2O$ in terms of outer percentage, from 1.5 to 3.0% of SrO in terms of inner percentage, and from 0.1 to 2.0% of $Nb_2O_5$ and/or $Ta_2O_5$ as a value obtained by [($Nb_2O_5$ content)+($Ta_2O_5$ content/1.66)], in terms of inner percentage.

12 Claims, No Drawings

HIGHLY ZIRCONIA-BASED REFRACTORY AND MELTING FURNACE

TECHNICAL FIELD

The present invention relates to a highly zirconia-based refractory suitable for a glass-melting furnace, and a melting furnace employing it, particularly to a highly zirconia-based refractory suitable for use in a melting furnace for low alkali glass or in an electric melting furnace for glass, and a melting furnace employing it.

BACKGROUND ART

Heretofore, a refractory containing zirconia ($ZrO_2$) as the main component, has been widely used at portions of inner walls of glass-melting furnaces which are in contact with molten glass, since it shows excellent corrosion resistance against molten glass.

However, a highly zirconia-based cast refractory composed mostly of $ZrO_2$ crystals (baddeleyite) undergoes a reversible crystalline modification from monocline phase to tetragonal phase specific to the $ZrO_2$ crystals in the vicinity of 1,100° C. and, hence, has a problem that due to abnormal volume expansion and shrinkage along with the crystalline modification, cracking is likely to occur particularly in the case of a refractory with a practical large size.

As a method for producing a refractory containing about 90 or higher mass % of $ZrO_2$ which is free from such cracking, a method is known wherein to a glass phase (hereinafter referred to as matrix glass) composed mainly of $SiO_2$ filling spaces among the $ZrO_2$ crystals, a component to soften glass is incorporated to adjust the glass phase, so that a distortion due to the expansion and shrinkage of $ZrO_2$ crystals within a temperature range for the crystalline modification of $ZrO_2$ crystals, is absorbed by the soft matrix glass.

In such a case, it is common to use $SiO_2$ as the main component of the matrix glass, but with $SiO_2$ only, the viscosity will be high and it is difficult to absorb the abnormal volume change, and therefore, an alkali metal component (such as $Na_2O$ or $K_2O$) or an alkaline earth metal component (such as CaO, MgO, SrO or BaO) is incorporated as a component to reduce the viscosity of the matrix glass. Such a component imparts to the matrix glass such a proper viscosity that the stress formed in a refractory in the transition temperature range of the baddeleyte crystals, can be relaxed. With the highly zirconia-based refractory thus obtained, cracking is reduced, and it can be used in a stabilized state for a long period of time.

On the other hand, in recent years, high purity glass or fine glass having little content of an alkali metal component and having a high melting point, has been used as glass for liquid crystal, and a highly zirconia-based refractory has now been used also for a glass-melting furnace to produce such glass.

However, when used as a refractory for lining a glass-melting furnace to melt low alkali glass, such a highly zirconia-based refractory is likely to have such a problem that the alkali metal component (mainly $Na_2O$) tends to elute into the glass, and cracks are thereby likely to form in the refractory. That is, the alkali metal component contained in the matrix glass not only has an effect to lower the viscosity of the matrix glass but also has a function to suppress formation of zircon ($ZrO_2 \cdot SiO_2$) crystals by a reaction of $SiO_2$ with zirconia in the matrix glass. Therefore, if the alkali metal component in the matrix glass elutes into the molten glass, zircon is likely to be formed in the refractory to increase the viscosity of the matrix glass, whereby cracks tend to be formed in the refractory.

Further, in recent years, attention has been drawn to an electric melting method of directly applying an electric current to a glass raw material to heat and melt it, as a method for producing glass of high quality while saving energy. In a case where the electric melting method is employed, the refractory is required to have a higher electrical resistivity than molten glass so that an electric current flows in the molten glass. In the case of the above-mentioned highly zirconia-based refractory containing an alkali metal component in the matrix glass, if it is attempted to directly apply an electric current to molten glass to heat and melt the glass, the alkali metal component present in such a refractory tends to show ionic conductivity, and further at a high temperature exceeding 1,000° C., zirconia also tends to show electrical conductivity, whereby a part of the applied electric power tends not to flow in molten glass but to flow in the refractory surrounding the molten glass, thus leading to a problem that this method cannot be applied.

In order to solve such a problem, Patent Document 1 proposes a highly zirconia-based refractory having a high electrical resistivity at 1,500° C. This refractory is made to have a composition which does not substantially contain a $Na_2O$ component which has a small ionic radius and which makes the electrical resistivity remarkably small, and instead, from 0.5 to 1.5% of $B_2O_3$ and at most 1.5% of $K_2O$ having a large ionic radius are incorporated to adjust the viscosity of the matrix glass thereby to obtain a highly zirconia-based refractory which has a high electrical resistivity and is free from cracking.

However, among the contained alkali metal and alkaline earth metal components ($K_2O$, $Rb_2O$, $Cs_2O$, SrO and BaO), one or more are small in content at a level of at most 1.5%, and, hence, at a high temperature, zircon is likely to be formed in the refractory, such being inadequate to prevent cracking.

Patent Document 2 proposes a highly zirconia-based refractory having a high electric resistivity, which does not contain $Na_2O$ or $K_2O$ showing ionic conductivity, but instead, contains from 0.3 to 3% of at least one of BaO, SrO and CaO.

However, a problem has been pointed out such that cracking is likely to take place during heating one side, since neither $Na_2O$ nor $K_2O$ is contained.

Patent Document 3 proposes a highly zirconia-based refractory having a high electrical resistivity at a high temperature and excellent heat cycle resistance, as it contains $K_2O$ and $Na_2O$ in a total amount of from 0.01 to 0.12%, and contains $K_2O$ in an amount larger than $Na_2O$.

However, since no alkaline earth metal component is contained, $Na_2O$ is incorporated, whereby the electrical resistivity has been inadequate.

Patent Document 4 also proposes a highly zirconia-based refractory having a high electrical resistivity at a high temperature. However, its electrical resistivity is inadequate, since it contains $Na_2O$ in an amount of at least 0.05%, and it also has a problem such that in contact with molten low alkali glass, $Na_2O$ is likely to elute, thus leading to cracking.

Patent Document 5 proposes to obtain a highly zirconia-based refractory having a high electrical resistivity by adjusting $Al_2O_3$ to be from 0.9 to 2.5%, $SiO_2$ to be from 4.0 to 10.0%, $ZrO_2$ to be from 86 to 95%, $B_2O_3$ to be from 0.1 to 1.2%, $Na_2O$ to be at most 0.04%, CaO to be at most 0.4%, $Fe_2O_3$ to be at most 0.1%, and $TiO_2$ to be at most 0.25%.

However, in each of Examples disclosed, CaO is contained. CaO is a substance which is solid-solubilized in $ZrO_2$, and it is reported that as solid-solubilized, it increases oxygen vacancies to bring about an oxygen ion conductivity. For this reason, the content of CaO is not suitable for the purpose of increasing the electrical resistivity at a high temperature.

Patent Document 6 proposes to limit $Na_2O$ to be less than 0.05 wt % and $K_2O$ to be from 0.01 to 0.2 wt % and further adjust components such as $B_2O_3$, $Al_2O_3$, BaO, CaO, $Y_2O_3$ and SrO, thereby to obtain a highly zirconia-based refractory having a high electrical resistivity with little change with time at a high temperature.

However, the refractory contains at least 0.01% of CaO which is solid-solubilized in $ZrO_2$, and from 0.05 to 0.4% of $Y_2O_3$. For the above-mentioned reason, the content of CaO is undesirable from the viewpoint of the electrical resistivity. $Y_2O_3$ is also known to be solid-solubilized in $ZrO_2$ thereby to increase oxygen vacancies and bring about an oxygen ion conductivity, and if it is contained, it likewise lowers the electrical resistivity.

Patent Document 7 proposes to add $CrO_3$, $Nb_2O_5$, $MoO_3$, $Ta_2O_5$ and $WO_3$ thereby to obtain a highly zirconia-based refractory having a high electrical resistivity.

However, in each of Examples disclosed, neither $K_2O$ nor an alkaline earth metal component is contained. Further, more than 98.5% is required to be occupied by components of $ZrO_2+HfO_2$, $SiO_2$, $Al_2O_3$, $Y_2O_3$, $B_2O_3$, $CrO_3$, $Nb_2O_5$, $MoO_3$, $Ta_2O_5$ and $WO_3$, and, hence, it is not possible to add an alkali metal component, an alkaline earth metal component, $P_2O_5$, etc. in an amount of at least 1.5%, such being inadequate to prevent cracking during the temperature rise and operation.

PRIOR ART DOCUMENTS

Patent Documents

Patent Document 1: JP-A-63-285173
Patent Document 2: JP-A-4-193766
Patent Document 3: JP-A-6-287059
Patent Document 4: JP-A-2004-99441
Patent Document 5: JP-A-2007-517754
Patent Document 6: JP-A-2008-7358
Patent Document 7: US-A-2008/0076659

DISCLOSURE OF INVENTION

Technical Problem

The present invention has been made to solve the above-mentioned problems, and it is an object of the present invention to provide a highly zirconia-based refractory suitable for an electric melting furnace, which has a high electrical resistivity and does not exhibit a chipping off phenomenon such that the refractory surface partially chips off during temperature rise and which is scarcely susceptible to extraction of components even when in contact with molten low alkali glass and, hence, is less susceptible to cracking during operation, particularly a highly zirconia-based refractory suitable for use in an electric melting furnace for low alkali borosilicate glass containing at least 4.0% of SrO.

Solution to Problem

The highly zirconia-based refractory of the present invention comprises, as chemical components by mass %, from 85 to 95% of $ZrO_2$ in terms of inner percentage, from 3.0 to 10% of $SiO_2$ in terms of inner percentage, from 0.85 to 3.0% of $Al_2O_3$ in terms of inner percentage, substantially no $Na_2O$, from 0.01 to 0.5% of $K_2O$ in terms of outer percentage, from 1.5 to 3.0% of SrO in terms of inner percentage, and from 0.1 to 2.0% of $Nb_2O_5$ and/or $Ta_2O_5$ as a value obtained by "($Nb_2O_5$ content)+($Ta_2O_5$ content/1.66)", in terms of inner percentage.

Advantageous Effects of Invention

According to the highly zirconia-based refractory of the present invention, it shows excellent corrosion resistance, when it contains, as the main constituting component, baddeleyite crystals and is used in contact with molten glass, and it is possible to obtain a refractory which has a high electrical resistivity at a high temperature and which is less susceptible to cracking.

Further, this highly zirconia-based refractory contains substantially no $Na_2O$ and has a stabilized glass phase formed by incorporating SrO. Thus, particularly when it is used for low alkali glass containing SrO, the same component is contained in both the molten glass and the matrix glass of the refractory, so that ion diffusion scarcely takes place, and it is possible to prevent formation of zircon due to modification of the matrix glass of the refractory.

DESCRIPTION OF EMBODIMENTS

The highly zirconia-based refractory of the present invention is one comprising the above-mentioned components, and each of such components will be described below.

In this specification, "%" for the content of each component means "mass %". Further, in this specification, "inner percentage" used for the amount of a component contained in a refractory, is meant for the proportion of the component in 100% when the entire refractory (but not including any component represented by outer percentage) is taken as 100%. For example, "$ZrO_2$ is contained in an amount of 90% in terms of inner percentage" means that when the entire refractory including the content of $ZrO_2$ (but not including any component represented by outer percentage) is taken as 100%, $ZrO_2$ is contained in an amount of 90% in such 100%. On the other hand, "outer percentage" is a proportion, based on the entire refractory (but not including any component represented by outer percentage), of a component not included in 100% when the entire refractory (but not including any component represented by outer percentage) is taken as 100%. For example, "$K_2O$ is contained in an amount of 0.1% in terms of outer percentage" means that when the entire refractory not including the content of $K_2O$ (or not including any component represented by outer percentage) is taken as 100%, $K_2O$ is additionally contained in an amount of 0.1%.

$ZrO_2$ presents a strong resistance against corrosion by molten glass and is contained as a main component of the refractory. Accordingly, when the $ZrO_2$ content in the refractory is large, the corrosion resistance against molten glass will be excellent, and in the present invention, in order to obtain a sufficient corrosion resistance against molten glass, the content of $ZrO_2$ is made to be at least 85% in terms of inner percentage, preferably at least 88% in terms of inner percentage. It is more preferably at least 88.5%, particularly preferably at least 89%, in terms of inner percentage.

On the other hand, if the content of $ZrO_2$ exceeds 95% in terms of inner percentage, the amount of the matrix glass tends to be relatively small, and it tends to be difficult to absorb the volume change due to transformation of baddeleyite crystals and thus tends to be difficult to obtain a refractory free from cracking. Accordingly, in the present invention, $ZrO_2$ is contained within a range of from 85 to 95% in terms of inner percentage in the refractory. Further, the content of $ZrO_2$ is preferably at most 94.5%, more preferably at most 94%, particularly preferably at most 93.5%, in terms of inner percentage.

$SiO_2$ is an essential component to form a matrix glass to relax a stress formed in the refractory. In order to obtain a refractory of a practical size free from cracks, such $SiO_2$ is required to be contained in an amount of at least 3.0%, preferably at least 3.5%, more preferably at least 5%, in terms of inner percentage in the refractory. However, if the content of $SiO_2$ component becomes large, the corrosion resistance tends to be low. Therefore, in the present invention, $SiO_2$ is contained within a range of from 3.0 to 10.0% in terms of inner percentage in the refractory. Further, the content of $SiO_2$ is preferably at most 9.7%, more preferably at most 9.5%, in terms of inner percentage.

$Al_2O_3$ has an important role to adjust the relation between the temperature and the viscosity of the matrix glass and has an effect to reduce the concentration of $ZrO_2$ component in the matrix glass. In order to prevent formation of crystals of e.g. zircon ($ZrO_2.SiO_2$) in the matrix glass by means of such an effect, the content of $Al_2O_3$ component is required to be at least 0.85% in terms of inner percentage. Further, in order to maintain the viscosity of the matrix glass in the crystalline modification temperature range of baddeleyite crystals to be at a proper level, the content of $Al_2O_3$ component is required to be at most 3.0% in terms of inner percentage. Therefore, in the present invention, $Al_2O_3$ is contained within a range of from 0.85 to 3.0% in terms of inner percentage in the refractory. The content of $Al_2O_3$ is preferably at least 0.87%, more preferably at least 0.89%, in terms of inner percentage.

If $Al_2O_3$ component exceeds 3.0%, it increases the viscosity of the matrix glass, and further, $Al_2O_3$ component tends to react with $SiO_2$ to form mullite (3 $Al_2O_3.SiO_2$), whereby the absolute amount of the matrix glass tends to decrease, and at the same time, due to the precipitated mullite crystals, the viscosity of the matrix glass tends to be high, and residual volume expansion tends to result. If such residual volume expansion accumulates by heat cycles, cracking will result in the refractory, and the stability of heat cycle resistance will be impaired. Therefore, in order to prevent precipitation of mullite in the matrix glass and to substantially reduce the accumulation of the residual volume expansion, the content of $Al_2O_3$ component is preferably at most 2.7%, more preferably at most 2.5%, particularly preferably at most 2.0%.

$Na_2O$ and $K_2O$ are important components influential over the viscosity of the matrix glass, and they also have an effect to suppress the concentration of $ZrO_2$ component melted in the matrix glass to some extent. However, $Na_2O$ should better be not substantially contained, since it substantially lowers the electrical resistivity even when contained in a small amount.

Like Na, K is also an alkali metal showing an ionic conductivity in glass, but as compared with Na, its ion radius is large, its ion mobility is small, and its influence over to the electrical resistivity is small. Further, SrO is present in a larger amount than $K_2O$ in the matrix glass, whereby mobility of $K^+$ ions is suppressed, and the decrease in the electrical resistivity will be less. Accordingly, when the content of $K_2O$ is at most 0.5% in terms of outer percentage, the decrease in the electrical resistivity is small. On the other hand, even with a content of 0.01% in terms of outer percentage, it is possible to obtain an effect to lower the viscosity of the matrix glass. Therefore, in the present invention, $K_2O$ is contained within a range of from 0.01 to 0.5% in terms of outer percentage, preferably within a range of from 0.01 to 0.3% in terms of outer percentage, in the refractory.

SrO is a component effective to obtain a refractory free from cracks, since it lowers the viscosity of the glass matrix of the refractory. In the present invention, substantially no $Na_2O$ is contained, and therefore, the content of SrO is required to be relative large i.e. at least 1.5% in terms of inner percentage. If it is added too much, the matrix glass becomes too soft, and it becomes impossible to maintain the shape of the refractory at a high temperature. Therefore, the upper limit is 3.0% in terms of inner percentage. Thus, in the present invention, SrO is contained within a range of from 1.5 to 3.0% in terms of inner percentage in the refractory. The SrO content is preferably from 1.7 to 2.6% in terms of inner percentage for the same reason.

Low alkali glass such as glass for liquid crystal contains SrO in many cases, and by incorporating the same SrO component also to the glass matrix component of the refractory, it becomes possible to let diffusion of ions hardly take place and to minimize the property changes during the use for a long period of time. Thus, in the present invention, it is possible to obtain a more effective refractory for a glass-melting furnace for the production of low alkali glass containing a SrO component. Therefore, SrO is an essential component in the present invention.

MgO and CaO which are also classified in an alkaline earth component like SrO, also have an effect to lower the viscosity of the matrix glass, but MgO and CaO tend to lower the electrical resistivity as they are solid-solubilized in a large amount in $ZrO_2$ and are thus regarded as undesirable components in the present invention. In a case where they are included as impurities, the content of each of them is preferably at most 0.5%, more preferably at most 0.1%, in terms of outer percentage in the refractory.

Like SrO, BaO is an alkaline earth component having a nature to lower the viscosity of the matrix glass without solid-solubilized in $ZrO_2$. If its total amount with SrO exceeds 3.0% in terms of inner percentage, the matrix glass tends to be too soft. BaO is not an essential component, but may be contained within a range of at most 3.0% as the total amount with SrO in terms of inner percentage. When BaO is contained, its content is preferably from 0.1 to 1.5% in terms of inner percentage.

$Nb_2O_5$ is effective to improve the electrical resistivity of the refractory. This is considered to be such that the pentavalent element is solid-solubilized in $ZrO_2$, whereby the oxygen deficiency of $ZrO_2$ has been compensated. However, if it is too much, $Nb_2O_5$ not solid-solubilized in zirconia is likely to increase in the matrix glass. If the concentration of $Nb_2O_5$ in the matrix glass increases, electron conductivity will be brought about to lower the electrical resistivity of the matrix glass, and consequently, the improvement in the electrical resistivity of $ZrO_2$ will be set off, and as the refractory, the electrical resistivity will be lowered.

Further, in addition to the above-described nature, if the $Nb_2O_5$ content in the refractory increases, it tends to be difficult to obtain a refractory free from cracks at the time of the production. Accordingly, $Nb_2O_5$ is contained within a range of from 0.1 to 2.0%, preferably from 0.2 to 1.5%, in terms of inner percentage in the refractory.

$Ta_2O_5$ is effective to increase the electrical resistivity of a highly zirconia-based refractory for the same reason as for $Nb_2O_5$. In order to obtain, by the incorporation of $Ta_2O_5$ only, the same level of the effect to improve the electrical resistivity as in the case of incorporation of $Nb_2O_5$ only, it is necessary to supply to $ZrO_2$ the same number of Ta atoms as the number of Nb atoms introduced into $ZrO_2$ at the time of incorporation of $Nb_2O_5$. Ta has a larger atomic mass, and in terms of mass, Ta is required to be contained in a larger amount. As calculated as oxides, $Ta_2O_5/Nb_2O_5$ becomes to be about 1.66. Therefore, when $Ta_2O_5$ is contained alone, it is contained within a range of from 0.2 to 3.3%, preferably from 0.3 to 2.5%, in terms of inner percentage in the refractory.

In a case where $Ta_2O_5$ and $Nb_2O_5$ are to be simultaneously contained, the content of $Ta_2O_5$ is required to be calculated to correspond to the content of $Nb_2O_5$ and can be calculated by the formula "($Nb_2O_5$ content)+($Ta_2O_5$ content/1.66)". Accordingly, when the range of the value calculated by this formula is set to be from 0.1 to 2.0% (in terms of inner percentage), such a range corresponds to the range wherein the above-mentioned effect can effectively be obtained. Further, this formula is applicable to a case where either one of them is contained alone, i.e. by substituting 0% for the other one in the formula.

$B_2O_3$ is a component which is contained mainly in the matrix glass together with $P_2O_5$ and which softens the matrix glass in cooperation with $P_2O_5$ in place of an alkali metal component and prevents deterioration of the electrical resistivity of the refractory at a high temperature.

In the present invention, in order to soften the matrix glass component, SrO is contained in an amount of from 1.5 to 3.0% in terms of inner percentage. Therefore, $B_2O_3$ and $P_2O_5$ are not essential components, and if they are contained in a large amount, the glass matrix tends to be too soft. When they are to be incorporated, it is preferred to adjust $B_2O_3$ within a range of from 0.03 to 1.0% in terms of outer percentage and to adjust $P_2O_5$ within a range of from 0.03 to 1.0% in terms of outer percentage. When $B_2O_3$ and $P_2O_5$ are to be incorporated, each of these components is more preferably at least 0.04%, further preferably at least 0.05%, in terms of outer percentage, and, on the other hand, more preferably at most 0.9%, further preferably at most 0.8%, in terms of outer percentage.

$Y_2O_3$ is, like CaO and MgO, a component which is solid-solubilized in $ZrO_2$ and which serves for stabilization. Further, it shows electrical conductivity at a high temperature and is thus utilized as a heater. Therefore, in the present invention, it is an undesirable component, but is contained as an impurity in the $ZrO_2$ raw material in many cases. The content of $Y_2O_3$ is preferably at most 0.3%, more preferably at most 0.2%, further preferably at most 0.1%, in terms of inner percentage.

When the content of $Fe_2O_3$ and $TiO_2$ which are contained as impurities in the raw material, is at most 0.55% in terms of inner percentage, there will be no problem of coloration in a usual glass melting furnace, and preferred is an amount not exceeding 0.3% in terms of inner percentage.

CuO brings about coloration of molten glass even in a small amount and therefore should not substantially be contained.

In this specification, "not substantially be contained" means "may be contained in an amount of not higher than an impurity level", and usually means that the content in the refractory is less than 0.01%.

Refractories to be used for glass melting furnaces may be generally classified into a sintered (fired) refractory and a fused cast refractory.

A sintered (fired) refractory is produced by mixing powdery raw materials homogeneously in the above-mentioned blend proportions and molding the mixture by e.g. pressing, followed by firing. This refractory can be produced at a low cost with a less amount of energy required during the production as compared with a fused cast refractory. Further, products having various shapes can thereby be produced, whereby processing may be required less. For such reasons, its application portions in a glass melting furnace may be increased, and further, there is a merit such that it can be produced at a low cost. However, a gas attached to raw materials or a part of a gas formed during the firing tends to remain after the sintering, whereby the density of the product tends to be hardly increased, and therefore, although the product shows corrosion resistance comparable to a fused cast refractory at a temperature of at most 1600° C., its corrosion resistance tends to deteriorate at a higher temperature. For this reason, for a glass melting furnace exceeding 1,600° C., a fused cast refractory is preferred.

A fused cast refractory is produced by mixing powdery raw materials homogeneously in the above-mentioned proportions, fusing the mixture by an electric arc furnace, and casting the fused material into a graphite mold, followed by cooling. This refractory is costly, since a large energy is required for the fusing. However, it is superior in the corrosion resistance to the sintered refractory, since the texture of $ZrO_2$ crystals is dense and the crystal size is large. The heating at the time of fusing is carried out by contacting a graphite electrode with the raw material powder and applying a current to the electrode.

The refractory thus obtained exhibits excellent corrosion resistance against molten glass, has a high electric resistivity at a high temperature and is less susceptible to cracking, and thus, it is suitable for a furnace material for a glass melting furnace to be used for producing a glass product such as plate glass. Here, the electric resistivity is, for example, preferably at least 300 Ω·cm at 1,500° C.

The glass melting furnace of the present invention is one produced by using the above-described refractory of the present invention, and the refractory may be used at portions of the melting furnace which are in contact with molten glass. At that time, with the glass melting furnace of the present invention, diffusion of ions is less likely to take place, and the change in its characteristics is small even when it is used for a long period of time, since against low alkali glass containing SrO, such as glass for liquid crystal, the glass matrix component of the refractory also contains the same SrO component. Thus, the glass melting furnace of the present invention is preferably for low alkali glass containing SrO, particularly preferably for low alkali borosilicate glass containing at least 4% of SrO, as glass to be thereby melted.

EXAMPLES

Now, the highly zirconia-based refractory of the present invention will be described in detail with reference to Examples, but it should be understood that the present invention is by no means restricted by such Examples. Here, either one of the following methods was used as the method for producing the refractory.

[Sintering Method]

In order to obtain a refractory by a sintering method, raw materials such as $ZrO_2$, $SiO_2$, $Al_2O_3$, $K_2CO_3$, $SrCO_3$, $Nb_2O_5$, $Ta_2O_5$, $ZrB_2$, $AlPO_4$, etc., and ethanol, were weighed by an electrobalance and put into a resin pot together with alumina balls for pulverization, followed by mixing by a ball mill. The mixed liquid of raw materials and ethanol thereby obtained, was subjected to distillation under reduced pressure to remove ethanol thereby to obtain a homogeneously mixed raw material powder.

The raw material powder was pressed by a mold press and further subjected to a pressure of 180 MPa by CIP to obtain a precursor, which was then subjected to heat treatment at 1,700° C. for 5 hours in the atmosphere by means of a resistance heating type electric furnace, to obtain a refractory.

[Electrically Fusing and Casting (Hereinafter Sometimes Referred to Simply as Electro Fused Cast) Method]

Further, in order to obtain a refractory by an electrically fusing and casting method, raw materials such as low soda alumina, silica, $SrCO_3$, $K_2CO_3$, $Nb_2O_5$, $Ta_2O_5$, $BPO_4$, $B_2O_3$, etc., are blended to desilicated zircon as a zirconia raw material, to obtain mixed raw materials, and such mixed raw materials were introduced into a single phase arc electric furnace with an output power of 500 kVA equipped with two graphite electrodes and completely melted at a temperature of from 2,200 to 2,400° C.

This melt was poured into a graphite mold having an internal volume of 160 mm×200 mm×350 mm preliminarily embedded in a Bayer alumina powder as a heat insulator, cast and left to cool to a temperature in the vicinity of room temperature. After the cooling, the cast product was taken out from the graphite mold to obtain a refractory.

Examples

Ex. 1 to 22, 30 and 31; and Comparative Examples: Ex. 23 to 25, 27 to 29 and 32 to 35

By the production methods as identified in Tables 1 to 4, refractories were produced to have the respective component proportions. With respect to various highly zirconia-based fused cast refractories thus obtained by the sintering method or the electro fused cast method, the chemical analytical values and various properties examined are also shown in Tables 1 to 4. In the Tables, CaO, MgO, $K_2O$, $B_2O_3$, $P_2O_5$ and $Na_2O$ are represented in terms of outer percentage, and other components are represented by inner percentage.

Although not shown in Tables 1 to 4, the content of CuO was less than 0.01% in each of the refractories produced by the sintering method and the electro fused cast method.

TABLE 1

| Components/% | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $ZrO_2$ | 91.1 | 90.8 | 90.3 | 90.1 | 90.5 | 89.6 | 90.5 | 90.9 | 90.9 |
| $SiO_2$ | 5.9 | 5.9 | 5.9 | 5.8 | 5.9 | 5.8 | 5.9 | 5.6 | 5.9 |
| $Al_2O_3$ | 1.2 | 1.2 | 1.2 | 1.2 | 1.2 | 1.2 | 1.2 | 1.1 | 1.2 |
| SrO | 1.5 | 1.5 | 1.5 | 1.5 | 2.0 | 2.9 | 1.5 | 1.6 | 1.5 |
| BaO | 0.0 | 0.0 | 0.0 | 0.0 | 0.0 | 0.0 | 0.0 | 0.0 | 0.0 |
| $Nb_2O_5$ | 0.2 | 0.5 | 1.0 | 1.4 | 0.5 | 0.5 | 0.0 | 0.4 | 0.5 |
| $Ta_2O_5$ | 0.0 | 0.0 | 0.0 | 0.0 | 0.0 | 0.0 | 0.8 | 0.4 | 0.0 |
| $Fe_2O_3 + TiO_2$ | 0.0 | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 | 0.0 | 0.0 |
| MgO | 0.0 | 0.0 | 0.0 | 0.0 | 0.0 | 0.0 | 0.0 | 0.0 | 0.0 |
| $K_2O$ | 0.02 | 0.02 | 0.02 | 0.02 | 0.02 | 0.02 | 0.02 | 0.03 | 0.10 |
| $B_2O_3$ | 0.0 | 0.0 | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 |
| Production method | Sintering | Sintering | Sintering | Sintering | Sintering | Sintering | Sintering | Sintering | Sintering |
| Cracks during production | Nil | Nil | Nil | Nil | Nil | Nil | Nil | Nil | Nil |
| Bulk density | 4.96 | 4.91 | 4.87 | 4.84 | 4.88 | 4.86 | 4.92 | 4.91 | 4.88 |
| Electrical resistivity at 1,500° C. (initial) | 735 | 947 | 482 | 350 | 676 | 521 | 999 | 952 | 824 |
| Electrical resistivity at 1,500° C. (condition A) | — | — | — | — | — | — | — | — | — |
| Zircon layer thickness mm (condition A) | — | 0 | — | — | 0 | — | — | — | — |
| Zircon layer thickness mm (condition B) | — | — | — | — | — | — | — | — | — |

TABLE 2

| Components/% | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| $ZrO_2$ | 90.9 | 90.8 | 91.1 | 90.7 | 93.6 | 89.4 | 89.4 | 91.4 | 93.3 |
| $SiO_2$ | 5.9 | 6.3 | 6.0 | 6.2 | 3.5 | 6.2 | 6.0 | 5.0 | 3.5 |
| $Al_2O_3$ | 1.2 | 1.2 | 1.2 | 1.2 | 0.9 | 1.1 | 1.4 | 1.0 | 0.9 |
| SrO | 1.5 | 1.5 | 1.5 | 1.6 | 1.5 | 2.6 | 2.2 | 1.6 | 1.5 |
| BaO | 0.0 | 0.0 | 0.0 | 0.0 | 0.0 | 0.0 | 0.0 | 0.0 | 0.0 |
| $Nb_2O_5$ | 0.5 | 0.2 | 0.2 | 0.3 | 0.5 | 0.4 | 0.7 | 0.7 | 0.5 |
| $Ta_2O_5$ | 0.0 | 0.0 | 0.0 | 0.0 | 0.0 | 0.0 | 0.0 | 0.0 | 0.0 |
| $Fe_2O_3 + TiO_2$ | 0.0 | 0.0 | 0.0 | 0.0 | 0.0 | 0.2 | 0.2 | 0.2 | 0.2 |
| $Y_2O_3$ | 0.0 | 0.0 | 0.0 | 0.0 | 0.0 | 0.1 | 0.1 | 0.1 | 0.1 |
| CaO | 0.0 | 0.0 | 0.0 | 0.0 | 0.0 | 0.05 | 0.04 | 0.04 | 0.04 |
| MgO | 0.0 | 0.0 | 0.0 | 0.0 | 0.0 | 0.01 | 0.01 | 0.01 | 0.01 |
| $K_2O$ | 0.20 | 0.02 | 0.02 | 0.01 | 0.05 | 0.02 | 0.03 | 0.10 | 0.05 |
| $B_2O_3$ | 0.0 | 0.05 | 0.0 | 0.05 | 0.00 | 0.31 | 0.41 | 0.20 | 0.10 |
| $P_2O_5$ | 0.0 | 0.0 | 0.05 | 0.05 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 |
| Production method | Sintering | Sintering | Sintering | Sintering | Sintering | Electro fused cast | Electro fused cast | Electro fused cast | Electro fused cast |
| Cracks during production | Nil | Nil | Nil | Nil | Nil | Nil | Nil | Nil | Nil |
| Bulk density | 4.87 | 4.87 | 4.89 | 4.88 | 5.24 | 5.17 | 5.15 | 4.92 | 5.30 |
| Electrical resistivity at 1,500° C. (initial) | 929 | 723 | 754 | 745 | 343 | 380 | 540 | 451 | 322 |

TABLE 2-continued

| Components/% | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Electrical resistivity at 1,500° C. (condition A) | — | — | — | — | 315 | — | — | 435 | 339 |
| Zircon layer thickness mm (condition A) | — | 0 | — | — | 0 | — | — | 0 | 0 |
| Zircon layer thickness mm (condition B) | — | — | — | — | 1 | — | — | 0.5 | 1 |

TABLE 3

| Components/% | Ex. 19 | Ex. 20 | Ex. 21 | Ex. 22 | Ex. 23 | Ex. 24 | Ex. 26 | Ex. 27 |
|---|---|---|---|---|---|---|---|---|
| $ZrO_2$ | 92.9 | 88.9 | 86.1 | 90.7 | 90.5 | 90.3 | 89.8 | 89.2 |
| $SiO_2$ | 3.7 | 6.2 | 9.2 | 3.9 | 8.0 | 8.0 | 8.0 | 5.8 |
| $Al_2O_3$ | 0.9 | 0.9 | 2.4 | 1.0 | 1.2 | 1.2 | 1.2 | 1.2 |
| SrO | 1.7 | 1.6 | 1.5 | 1.5 | 0.2 | 0.5 | 1.0 | 3.4 |
| BaO | 0.0 | 1.3 | 0.0 | 0.0 | 0.0 | 0.0 | 0.0 | 0.0 |
| $Nb_2O_5$ | 0.5 | 0.7 | 0.5 | 0.0 | 0.0 | 0.0 | 0.0 | 0.5 |
| $Ta_2O_5$ | 0.0 | 0.0 | 0.0 | 2.6 | 0.0 | 0.0 | 0.0 | 0.0 |
| $Fe_2O_3 + TiO_2$ | 0.2 | 0.2 | 0.2 | 0.2 | 0.0 | 0.0 | 0.0 | 0.0 |
| $Y_2O_3$ | 0.1 | 0.1 | 0.1 | 0.1 | 0.0 | 0.0 | 0.0 | 0.0 |
| CaO | 0.04 | 0.04 | 0.04 | 0.04 | 0.0 | 0.0 | 0.0 | 0.0 |
| MgO | 0.01 | 0.01 | 0.01 | 0.01 | 0.0 | 0.0 | 0.0 | 0.0 |
| $K_2O$ | 0.40 | 0.10 | 0.05 | 0.20 | 0.01 | 0.01 | 0.01 | 0.02 |
| $B_2O_3$ | 0.10 | 0.20 | 0.80 | 0.10 | 0.0 | 0.0 | 0.0 | 0.0 |
| $P_2O_5$ | 0.0 | 0.0 | 0.0 | 0.0 | 0.0 | 0.0 | 0.0 | 0.0 |
| $Na_2O$ | 0.04 | 0.04 | 0.04 | 0.04 | 0.0 | 0.0 | 0.0 | 0.0 |
| Production method | Electro fused cast | Electro fused cast | Electro fused cast | Electro fused cast | Sintering | Sintering | Sintering | Sintering |
| Cracks during production | Nil | Nil | Nil | Nil | Observed | Observed | Nil | Nil |
| Bulk density | 5.25 | 4.89 | 4.78 | 4.91 | 4.82 | 4.86 | 4.88 | 4.79 |
| Electrical resistivity at 1,500° C. (initial) | 325 | 352 | 425 | 312 | — | — | — | Impossible to measure |
| Electrical resistivity at 1,500° C. (condition A) | 314 | — | — | — | — | — | — | — |
| Zircon layer thickness mm (condition A) | 0 | — | — | — | — | — | 2-3 | — |
| Zircon layer thickness mm (condition B) | 0 | — | — | — | — | — | — | — |

TABLE 4

| Components/% | Ex. 28 | Ex. 29 | Ex. 30 | Ex. 31 | Ex. 32 | Ex. 33 | Ex. 34 | Ex. 35 |
|---|---|---|---|---|---|---|---|---|
| $ZrO_2$ | 92.8 | 91.2 | 89.5 | 89.2 | 90.6 | 90.6 | 90.6 | 88.8 |
| $SiO_2$ | 3.5 | 3.6 | 6.3 | 6.5 | 5.9 | 5.9 | 5.9 | 9.3 |
| $Al_2O_3$ | 1.6 | 1.4 | 1.2 | 1.2 | 1.2 | 1.2 | 1.2 | 1.5 |
| SrO | 0.0 | 0.9 | 1.6 | 1.6 | 1.5 | 1.5 | 1.5 | 0.0 |
| BaO | 0.0 | 0.0 | 0.0 | 0.0 | 0.0 | 0.0 | 0.0 | 0.0 |
| $Nb_2O_5$ | 1.8 | 2.6 | 0.5 | 0.5 | 0.5 | 0.5 | 0.5 | 0.0 |
| $Ta_2O_5$ | 0.0 | 0.0 | 0.0 | 0.0 | 0.0 | 0.0 | 0.0 | 0.0 |
| $Fe_2O_3 + TiO_2$ | 0.2 | 0.2 | 0.2 | 0.2 | 0.2 | 0.2 | 0.2 | 0.2 |
| $Y_2O_3$ | 0.1 | 0.1 | 0.1 | 0.1 | 0.1 | 0.1 | 0.1 | 0.1 |
| CaO | 0.04 | 0.04 | 0.04 | 0.7 | 0.04 | 0.04 | 0.04 | 0.04 |
| MgO | 0.01 | 0.01 | 0.6 | 0.01 | 0.01 | 0.01 | 0.01 | 0.01 |
| $K_2O$ | 0.02 | 0.01 | 0.02 | 0.01 | 0.0 | 0.0 | 0.15 | 0.05 |
| $B_2O_3$ | 0.75 | 0.74 | 0.10 | 0.10 | 0.20 | 0.18 | 0.20 | 0.10 |
| $P_2O_5$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.11 | 0.21 | 0.21 |
| Production method | Electro fused cast | Electro fused cast | Electro fused cast | Electro fused cast | Electro fused cast | Electro fused cast | Electro fused cast | Electro fused cast |
| Cracks during production | Observed | Observed | Nil | Nil | Nil | Nil | Nil | Nil |

TABLE 4-continued

| Components/% | Ex. 28 | Ex. 29 | Ex. 30 | Ex. 31 | Ex. 32 | Ex. 33 | Ex. 34 | Ex. 35 |
|---|---|---|---|---|---|---|---|---|
| Bulk density | 5.34 | 5.43 | 5.02 | 5.14 | 5.10 | 5.10 | 5.08 | 4.93 |
| Electrical resistivity at 1,500° C. (initial) | — | 191 | 286 | 275 | 290 | 225 | 218 | 448 |
| Electrical resistivity at 1,500° C. (condition A) | — | — | 292 | 261 | 327 | 294 | 228 | 276 |
| Zircon layer thickness mm (condition A) | — | — | 1 | 1 | 3-4 | 3-4 | 0 | Entire surface |
| Zircon layer thickness mm (condition B) | — | — | — | — | 3-4 | 3-4 | 0 | — |

The presence or absence of cracks during the production was evaluated by visually observing the presence or absence of cracks immediately after the production of a refractory.

Further, the high temperature electrical resistivity (1,500° C.) was calculated as follows. Firstly, a circular plate sample having a diameter of 20 mm and a thickness of from 3 to 5 mm was cut out from a refractory. On one side of the sample, the main electrode and a guard electrode were, and on the other side, only a counter electrode was, baked by means of a platinum paste. A platinum electrode to measure the electrical resistance of the sample was set in an electric furnace capable of raising the temperature to the maximum temperature of 1,700° C., and then the sample was introduced into the electric furnace. While heating at a temperature raising rate of 5° C./min, the volume resistance was continuously measured by a three-terminal method in accordance with JIS C2141 while applying an AC voltage (constant) with a frequency of 120 Hz by an insulation resistance meter. From the obtained volume resistance, a volume resistivity was calculated and taken as the initial high temperature electrical resistivity ($\Omega \cdot cm$).

The presence or absence of zircon formed in a refractory when it is brought in contact with molten glass, was evaluated in such a manner that a rod-shaped test specimen of 15 mm×25 mm×75 mm was cut out from the refractory and hanged for 48 hours in a platinum crucible wherein alkali-free borosilicate glass containing at least 4% of SrO was preliminarily put and melted at 1,550° C., and then, the presence or absence of formation of zircon in the rod-shaped test specimen was observed by an electron microscope. Further, for the electrical resistivity after contact with molten glass, a rod-shaped test specimen of 15 mm×35 mm×60 mm was cut out from a refractory and immersed for 96 hours in alkali-free borosilicate glass containing at least 4% of SrO, melted at 1,620° C. in a platinum crucible, and then, a circular plate sample having a diameter of 20 mm and a thickness of from 3 to 5 mm was cut out from the immersed portion and measured by the above-described method. In the Tables, "condition A" means after contact with the following molten glass A, and "condition B" means after contact with the following molten glass B.

As molten glass, alkali-free borosilicate type glass was used. Molten glass A was glass containing at least 4% of SrO and specifically contained 66% of $SiO_2$, 11% of $Al_2O_3$, 8% of $B_2O_3$, 5% of MgO, 5% of CaO, and 5% of SrO. On the other hand, molten glass B was glass having less than 4% of SrO content and specifically contained 67% of $SiO_2$, 11% of $Al_2O_3$, 11% of $B_2O_3$, 3% of MgO, 7% of CaO, and 2% of SrO. In each of Ex. 2, 5 and 11, no formation of zircon was observed, but in Ex. 25 (Comparative Example), formation of zircon was confirmed, since the content of SrO was small.

Further, in Ex. 23 and 24 (Comparative Examples) wherein the content of SrO was small, the viscosity of the matrix glass was inadequate, whereby it was not possible to absorb the volume change of zirconia and cracks were formed during the production.

In Ex. 27 (Comparative Example), the content of SrO was more than 3.0%, whereby it was possible to obtain a refractory free from cracks, but during the measurement of the electrical resistivity, high temperature glass oozed out, whereby it was not possible to obtain a reliable electrical resistivity value.

In Ex. 28 (Comparative Example), no SrO was contained, whereby it was not possible to obtain a refractory free from cracks.

In Ex. 29 (Comparative Example), the content of SrO was small, whereby cracks were observed at a part of the refractory. Further, the high temperature electrical resistivity was also low. In Ex. 30 and 31 (Examples), refractories containing MgO and CaO were produced by the electro fused cast method. Ones free from cracks were obtained, but the electrical resistivity at 1,500° C. was slightly low, and formation of zircon was observed, although only slightly, when it was immersed in molten-glass-containing at least 4% of SrO. In Ex. 32, 33 and 34 (Comparative Examples), $Na_2O$ was contained, whereby the electrical resistivity at 1,500° C. was low. Further, a change with time of the electrical resistivity at 1,500° C. was observed, which is considered to be attributable to elution of Na to molten glass. In Ex. 32 and 33 wherein no $K_2O$ was contained, remarkable formation of zircon was observed when the refractories were immersed in molten glass containing at least 4% of SrO.

In Ex. 35 (Comparative Example), no $Na_2O$ was contained, and highly insulating $SiO_2$ was increased, whereby the initial electrical resistivity was high even if no $Nb_2O_5$ was contained, but when the test specimen was immersed in molten glass containing at least 4% of SrO, the electrical resistivity at 1,500° C. decreased due to substitution of the component. Further, since it contained no SrO, formation of zircon was observed even at the center portion of the rod-shaped test specimen immersed in molten glass containing at least 4% of SrO.

In Ex. 1 to 4 (Examples), a high electrical resistivity at a high temperature was obtained without formation of cracks. When the content of $Nb_2O_5$ was 0.5%, the electrical resistivity was at the peak, but it was confirmed that as the content increased, the electrical resistivity tended to decrease.

In Ex. 5 and 6 (Examples), the content of SrO was increased to 2.9%, but no formation of cracks was observed during the production, and it was possible to obtain a refractory having a high electrical resistivity and being free from formation of zircon even when it was contacted with molten glass. However, it was confirmed that along with the increase of SrO, the electrical resistivity tended to decrease.

In Ex. 7 and 8 (Examples), even if $Ta_2O_5$ was contained instead of $Nb_2O_5$ or even if both of $Nb_2O_5$ and $Ta_2O_5$ were contained, no formation of cracks was observed and it was possible to obtain refractories showing a high electrical resistivity at a high temperature, so long as the content was within the claimed range.

In Ex. 9 and 10 (Examples), $K_2O$ was increased and contained up to 0.2%. Nevertheless, no substantial decrease in the electrical resistivity was observed, and it was possible to obtain refractories having a sufficiently high electrical resistivity.

In Ex. 11, 12 and 13 (Examples), even if $B_2O_3$ or $P_2O_5$ was contained, no formation of cracks was observed and it was possible to obtain refractories showing a high electrical resistivity at a high temperature, so long as the content was within the claimed range. In Ex. 15 to 22 (Examples), the production was carried out by the electro fused cast method, whereby no formation of cracks was observed, and the electrical resistivity at 1,500° C. was high. In Ex. 17 to 19, the electrical resistivity at 1,500° C. was observed at the initial stage and after the contact with alkali-free borosilicate type molten glass containing at least 4% of SrO, whereby no substantial change was observed, and it was confirmed that the durability was excellent. Further, no formation of zircon in the refractories was observed. However, after the immersion in alkali-free borosilicate type molten glass having a SrO content of less than 4%, formation of zircon in the refractories was observed although only slightly, except for Ex. 19. In Ex. 19, the SrO content was as large as 1.7%, whereby it was observed that formation of zircon in the refractory was suppressed even in contact with alkali-free borosilicate type molten glass having a SrO content of less than 4%.

From the foregoing test results, it has been found that according to the present invention, it is possible to obtain a highly zirconia-based refractory which has a high electrical resistivity at a high temperature and which scarcely forms zircon in the refractory even when contacted with molten low alkali glass.

INDUSTRIAL APPLICABILITY

While there is an increasing demand for a high quality refractory suitable for a glass melting furnace for producing high purity glass or glass with a high melting point containing no alkali component, such as a fine glass product such as a glass substrate for liquid crystal, the highly zirconia-based refractory of the present invention is a high quality refractory capable of responding to the demand of such high technology industry and presents excellent effects such as an effect to improve the quality and yield of such a fine glass product and an effect to save electric power for an electric melting furnace, and thus, its effects for industrial application are substantial.

This application is a continuation of PCT Application No. PCT/JP2010/056097, filed Apr. 2, 2010, which is based upon and claims the benefit of priority from Japanese Patent Application No. 2009-091959 filed on Apr. 6, 2009. The contents of those applications are incorporated herein by reference in its entirety.

What is claimed is:

1. A highly zirconia-based refractory comprising, as chemical components by mass %, from 85 to 95% of $ZrO_2$ in terms of inner percentage, from 3.0 to 10% of $SiO_2$ in terms of inner percentage, from 0.85 to 3.0% of $Al_2O_3$ in terms of inner percentage, substantially no $Na_2O$, from 0.01 to 0.5% of $K_2O$ in terms of outer percentage, from 1.5 to 3.0% of SrO in terms of inner percentage, and from 0.1 to 2.0% of $Nb_2O_5$ and/or $Ta_2O_5$ as a value obtained by "($Nb_2O_5$ content)+($Ta_2O_5$ content/1.66)", in terms of inner percentage.

2. The highly zirconia-based refractory according to claim 1, which contains from 0.03 to 1.0% of $B_2O_3$ in terms of outer percentage.

3. The highly zirconia-based refractory according to claim 1, which contains from 0.03 to 1.0% of $P_2O_5$ in terms of outer percentage.

4. The highly zirconia-based refractory according to claim 1, which contains from 0.03 to 1.0% of $B_2O_3$ in terms of outer percentage, and from 0.03 to 1.0% of $P_2O_5$ in terms of outer percentage.

5. The highly zirconia-based refractory according to claim 1, which contains from 0.1 to 1.5% of BaO in terms of inner percentage.

6. The highly zirconia-based refractory according to claim 1, which contains from 0.03 to 1.0% of $B_2O_3$ in terms of outer percentage, and from 0.1 to 1.5% of BaO in terms of inner percentage.

7. The highly zirconia-based refractory according to claim 1, which contains from 0.03 to 1.0% of $P_2O_5$ in terms of outer percentage, and from 0.1 to 1.5% of BaO in terms of inner percentage.

8. The highly zirconia-based refractory according to claim 1, which contains from 0.03 to 1.0% of $B_2O_3$ and from 0.03 to 1.0% of $P_2O_5$ in terms of outer percentage, and from 0.1 to 1.5% of BaO in terms of inner percentage.

9. The highly zirconia-based refractory according to claim 1, which is obtained by fusing and casting raw materials.

10. The highly zirconia-based refractory according to claim 1, which is used for a melting furnace for melting low alkali glass containing SrO.

11. The highly zirconia-based refractory according to claim 10, wherein the low alkali glass is borosilicate glass containing at least 4% of SrO in terms of inner percentage.

12. A glass-melting furnace employing the highly zirconia-based refractory as defined in claim 1.

* * * * *